(12) United States Patent
Zwettler

(10) Patent No.: US 6,457,664 B1
(45) Date of Patent: Oct. 1, 2002

(54) HYBRID BELT-DRIVEN DATA STORAGE TAPE CARTRIDGE

(75) Inventor: Christopher J. Zwettler, Lake Elmo, MN (US)

(73) Assignee: Imation Corp., Oakdale, MN (US)

( * ) Notice: Subject to any disclaimer, the term of this patent is extended or adjusted under 35 U.S.C. 154(b) by 86 days.

(21) Appl. No.: 09/635,106

(22) Filed: Aug. 9, 2000

(51) Int. Cl.$^7$ .................. G11B 23/087; G11B 15/26
(52) U.S. Cl. ................ 242/342; 242/352.4; 360/96.3; 360/132
(58) Field of Search ............... 242/338.4, 340, 242/342, 346, 352.4, 336; 360/96.5, 96.3, 132

(56) References Cited

U.S. PATENT DOCUMENTS

| | | | | |
|---|---|---|---|---|
| 1,942,890 A | * | 1/1934 | Wittel | 242/352.4 |
| 3,808,902 A | * | 5/1974 | Grant | 242/352.4 |
| 3,942,743 A | * | 3/1976 | Jinsenji | 242/346 |
| 4,431,146 A | * | 2/1984 | Merle | 242/352.4 |
| 4,474,342 A | * | 10/1984 | Nater | 242/352.4 |
| 4,720,202 A | * | 1/1988 | Kawakami | 242/352.4 |
| 4,832,283 A | | 5/1989 | Treff et al. | |
| 5,337,608 A | | 8/1994 | Egan et al. | |
| 5,346,155 A | * | 9/1994 | Alexander et al. | 242/342 |
| 5,558,291 A | | 9/1996 | Anderson et al. | |
| 5,625,510 A | * | 4/1997 | Albrecht et al. | 360/96.3 |
| 5,722,610 A | | 3/1998 | Smith et al. | |
| 5,823,455 A | | 10/1998 | Hable et al. | |
| 5,870,924 A | | 2/1999 | Fahimi et al. | |
| 6,069,777 A | | 5/2000 | Vanderheyden et al. | |
| 6,164,579 A | * | 12/2000 | Todd | 242/342 |
| 6,249,401 B1 | * | 6/2001 | Zwettler | 242/352.4 |
| 6,279,845 B1 | * | 8/2001 | Hemzacek et al. | 242/340 |

* cited by examiner

*Primary Examiner*—William A. Rivera
(74) *Attorney, Agent, or Firm*—Eric D. Levinson

(57) ABSTRACT

A data storage tape cartridge incorporating a belt-driven design with improved performance characteristics. The tape cartridge includes a housing, first and second tape hubs, a storage tape, a drive roller, first and second corner rollers, and a drive belt. The housing defines a head access window. The first and second tape hubs are rotatably mounted within the housing. The storage tape is wound about the first and second hubs to form first and second tape packs thereabout. The drive roller is also rotatably mounted within the housing. Similarly, the first and second corner rollers are rotatably mounted within the housing. The drive belt is stretched about the drive roller, the first and second tape packs, and the first and second corner rollers. Finally, the first and second hubs are symmetrically arranged relative to the head access window. This symmetrical arrangement optimizes cartridge performance. Unlike prior art belt-driven tape cartridges, the tape cartridge of the present invention is not driven by a capstan or similar device, but instead is spline-driven.

41 Claims, 6 Drawing Sheets

HYBRID BELT-DRIVEN DATA STORAGE TAPE CARTRIDGE

BACKGROUND OF THE INVENTION

The present invention relates to a data storage tape cartridge. More particularly, it relates to a hybrid belt-driven tape cartridge with optimized performance characteristics.

Data storage tape cartridges have been used for decades in the computer, audio and video fields. While other forms of media storage are also available, the data storage tape cartridge continues to be an extremely popular form of recording large volumes of information for subsequent retrieval and use.

A variety of different data storage tape cartridge designs are currently available. In general terms, a data storage tape cartridge consists of an outer shell or housing maintaining at least one tape reel hub and a length of magnetic storage tape. The storage tape is wrapped about the hub and is driven through a defined tape path by a driving system. The housing typically includes an opening (or window) of some type for allowing access to the storage tape by a read/write head upon insertion of the cartridge into a tape drive. This interaction between storage tape and head may take place within the housing (e.g., a mid-tape load design), or the storage tape may be directed away from the housing to an adjacent area within the tape drive at which the head is located (for example, with a helical drive design or a leader block design). When the tape cartridge/drive system is designed to direct the storage tape away from the housing, the data storage tape cartridge typically includes a single tape reel. Conversely, where the tape cartridge/drive system is configured to provide head/storage tape interaction within or very near the housing, a two- or dual-tape reel assembly configuration is utilized.

Dual reel-type tape cartridges are further categorized according to the system used to drive the storage tape. More particularly, dual reel tape cartridges are either belt-driven or spool- (or hub-) driven. Both designs present certain advantages as outlined below.

The belt-driven tape cartridge has been known for many years and is described, for example, in U.S. Pat. No. 3,692,255 (von Behren), incorporated herein by reference. As illustrated in FIG. 1, a typical, prior art belt-driven tape cartridge 10 includes a housing 11 that contains a length of the storage tape 12 that is wound about a pair of tape reel hubs 12 (thereby defining "tape packs"). The housing 11 also encloses a pair of corner rollers 13 and a drive roller 14. An elastic drive belt 15 is stretched around the rollers 13 and 14 and the tape packs on the hubs 12. The drive roller 14 is accessible by a drive puck (or capstan) 16 of a tape drive through an opening 17 formed at the front of the housing 11.

Similarly, a window 18 is formed to allow a read/write head 19 to engage the storage tape 12. Movement of the drive roller 14 by the capstan 16 causes the drive belt 15 to move, and frictional engagement between the drive belt 15 and the storage tape 12 then causes the storage tape 14 to move. In addition to moving the storage tape 12, the drive belt 15 provides proper tension in the storage tape 12, especially at the read/write head 19. The storage tape 12 can be moved and read in either direction, (i.e., either hub can serve as the supply hub and either as the take-up hub).

The belt-driven tape cartridge is highly viable and relatively inexpensive, but may present certain tape drive registration issues, as well as power and speed losses during use due to the rubber-coated capstan 16. In addition, as is evidenced by FIG. 1, the drive roller 14 and hubs 12 are typically symmetrically arranged so as to optimize the cartridge layout. However, because the capstan 16 must pass through an opening 17 in the housing 11 to engage the drive roller 14, the head access window 18 must be offset from the drive roller 14. As a result, the hubs 12 are asymmetrically arranged relative to the head access window 18. This design constraint may adversely affect cartridge performance, as the head/storage tape interface cannot desirably occur at the bi-sector of the hubs. Further, location of the drive roller 14 relative to the head access window 18 dictates that guide pins or rollers are the only tools available to effectuate tape guidance across the head access window 18. It would be virtually impossible to incorporate an elongated tape guide that would otherwise provide beneficial "flying" guidance. Finally, industry-accepted form factors associated with currently available belt-driven tape cartridges prevents implementation of other components that might alleviate one or more of these potential concerns.

The spool-driven tape cartridge overcomes several of the concerns associated with the belt-driven design by forming the tape cartridge drive system to directly engage and drive (or rotate) the tape reels hubs. An example of a spool-driven tape cartridge is provided in U.S. Pat. No. 6,069,777 (Vanderheyden et al.), the teachings of which are incorporated here by reference. In general terms, the housing associated with the spool-driven tape cartridge forms two openings that are axially aligned with the tape reel hubs. The tape drive, in turn, includes two motorized, splined drive chucks that are directed into axial engagement with the respective tape reel hubs, via the openings, for subsequent controlled rotation thereof. In this regard, the tape reel hubs and splined drive chucks include corresponding toothed portions to facilitate driving engagement therebetweeen. Because the tape reel hubs are directly driven, the spool-driven tape cartridge eliminates the need for a drive belt, thereby obviating the power and speed losses otherwise experienced with belt-driven tape cartridges. However, because the drive belt is no longer included, a complex and expensive tension servo system must be incorporated into the tape drive to ensure proper tape tension at the read/write head. This requirement, in combination with the two motorized drive chucks, renders the spool-driven tape cartridge drive system relatively expensive, especially as compared to a belt-driven system. Further, similar to the belt-driven tape cartridge, industry-accepted form factor size associated with spool-driven tape cartridges limits the ability to implement additional features that might otherwise improve performance. For example, with available spool-driven tape cartridges, the tape reel hubs are asymmetrically arranged relative to the head access window, possibly affecting tape tension.

Data storage tape cartridges are important tools used to maintain vast amounts of information. With respect to dual reel cartridges, belt-driven and spool-driven designs offer certain advantages as well as potential disadvantages. Presently, no efforts have been made to derive a tape cartridge incorporating these features, due in large part to industry acceptance of current designs and the high costs of effectuating such a design. Therefore, a need exists for a hybrid tape cartridge and related tape drive that combines the features of the belt-driven and spool-driven cartridges on a low cost basis.

SUMMARY OF THE INVENTION

One aspect of the present invention relates to a data storage tape cartridge including a housing, first and second tape hubs, a storage tape, a drive roller, first and second corner rollers, and a drive belt. The housing defines a head access window. The first and second tape hubs are rotatably mounted within the housing. The storage tape is wound about the first and second hubs to form first and second tape packs thereabout. The drive roller and the first and second corner rollers are rotatably mounted within the housing. The drive belt is stretched about the drive roller, the first and second tape packs, and the first and second corner rollers. Finally, the first and second hubs are symmetrically arranged relative to the head access window. This symmetrical arrangement optimizes cartridge performance during use. In one preferred embodiment, the housing forms an opening along a major surface for allowing axial access to the drive roller by a splined drive chuck of a tape drive. With this one preferred embodiment, and unlike prior art belt-driven tape cartridges, a capstan does not engage the drive roller, but instead the drive roller is engaged by a motorized splined drive chuck. Alternatively, the hubs can be axially engaged and rotated by two motorized drive chucks. In yet another preferred embodiment, the housing is sized such that the first and second corner rollers are configured to each include a magnetic hysteresis-type brake.

Another aspect of the present invention relates to a data storage tape cartridge including a housing, first and second tape hubs, a storage tape, a drive roller, first and second corner rollers, and a drive belt. The housing defines a head access window. The first and second tape hubs are rotatably mounted within the housing. The storage tape is wound about the first and second tape hubs to form first and second tape packs thereabout. The drive roller and the first and second corner rollers are rotatably mounted within the housing. The drive belt is stretched about the drive rollers, the first and second tape packs, and the first and second corner rollers. Finally, the drive roller is aligned with the head access window. With this configuration, upon engagement of the tape cartridge with a tape drive that includes a head, interaction between the head and the storage tape at the head access window impedes radial access to the drive roller. As such, at least one of the drive roller, first tape hub or second tape hub must be axially accessed and driven by a motorized splined drive chuck. In one preferred embodiment, the tape cartridge further includes a base plate having first and second reference portions such that the tape cartridge provides three datum locations for registration by a registration device.

Yet another aspect of the present invention relates to a combination data storage tape cartridge and a tape drive. The data storage tape cartridge includes a housing, first and second tape hubs, a storage tape, a drive roller, first and second corner rollers, and a drive belt. The housing defines a head access window. The first and second tape hubs are rotatably mounted within the housing. The storage tape is wound about the first and second hubs to form first and second tape packs thereabout. The drive roller and the first and second corner rollers are rotatably mounted within the housing. The drive belt is stretched about the drive roller, the first and second tape packs, and the first and second corner rollers. The tape drive includes a motorized drive chuck for engaging and rotating one of the drive rollers, the first tape hub and the second tape hub. Further, the tape drive does not include a capstan for otherwise driving the drive roller. Unlike prior art belt-driven tape cartridge drive systems, the combination tape cartridge and tape drive of the present invention combines belt-driven and spool-driven design features, resulting in an inexpensive, highly efficient system.

Yet another aspect of the present invention relates to a tape drive for driving a data storage tape cartridge that includes a drive belt stretched about a drive roller and two tape packs. The tape drive comprises a rotatably driven, splined drive chuck configured to axially engage and rotatably drive the drive roller. In one preferred embodiment, the tape drive further includes a read/write head for transferring information to and from storage tape maintained by the tape cartridge. In this regard, the drive chuck is aligned with the read/write head.

Yet another aspect of the present invention relates to a data storage tape cartridge, first and second tape hubs, an elongated tape guide, a storage tape, a drive roller, first and second corner rollers, and a drive belt. The housing defines a head access window. The first and second tape hubs are rotatably mounted within the housing. The storage tape is wound about the first and second hubs to for first and second tape packs thereabout. The elongated tape guide is positioned adjacent the head access window and has a length greater than a length of the head access window. The elongated tape guide guides the storage tape across the head access window. The drive roller and the first and second corner rollers are rotatably mounted within the housing. The drive belt is stretched about the drive roller, the first and second tape packs, and the first and second corner rollers. In one preferred embodiment, the elongated tape guide is located between the head access window and the drive roller and provides for flying guidance of the storage tape at elevated tape speeds.

DETAILED DESCRIPTION OF THE PREFERRED EMBODIMENTS

Figure 2:
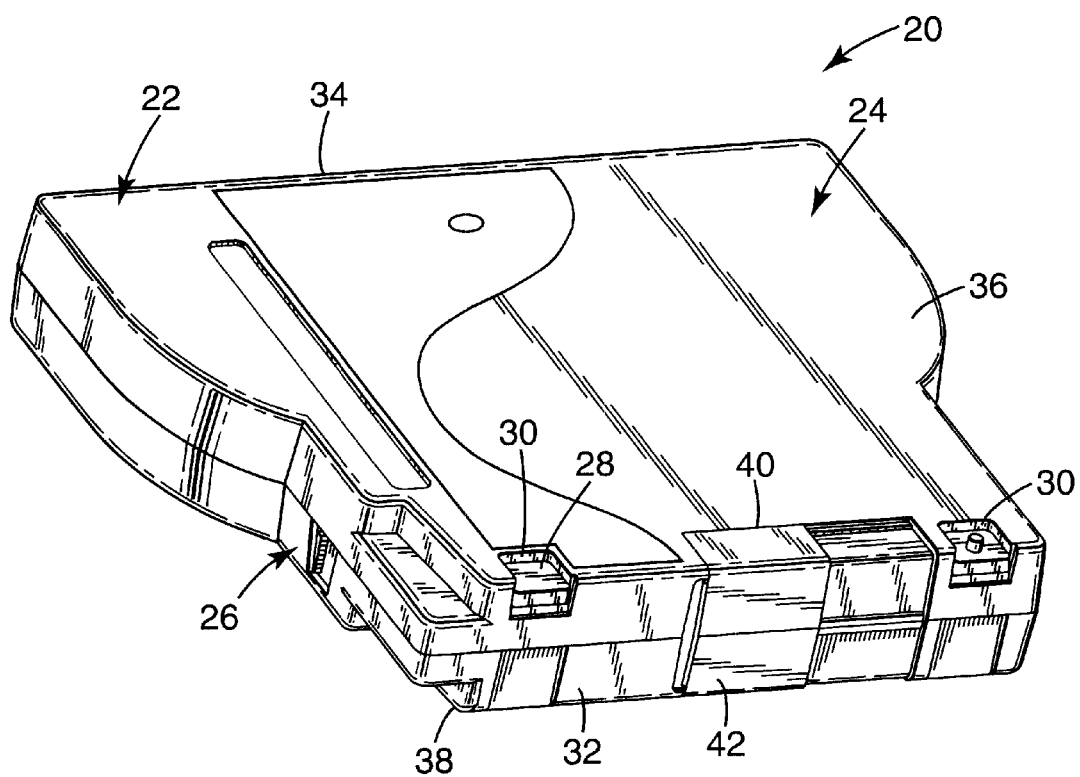
FIG. 2 is a perspective view of a tape cartridge in accordance with the present invention.

One preferred embodiment of a data storage tape cartridge (or "tape cartridge") 20 is shown in FIG. 2. Generally speaking, the tape cartridge 20 includes a housing 22 that, in one preferred embodiment, includes a first housing section 24 and a second housing section 26. The tape cartridge 20 further includes a base plate 28, a portion of which is exposed through notches 30 in the first housing section 24. Remaining components of the tape cartridge 20 are described in greater detail below. However, with reference to FIG. 2, it should be understood that the first housing section 24 and the second housing section 26 are reciprocally mated to one another and form an enclosure within which the various other components, including the base plate 28, are maintained.

The housing 22 is preferably sized to be received by a tape drive (not shown) sized in accordance with industry standards, and thus may assume available form factor sizes. The housing 22, and thus the first housing section 24 and the second housing section 26, defines a front 32, a back 34, a first major surface 36 and a second major surface 38 (partially hidden in FIG. 2).

Figure 1:
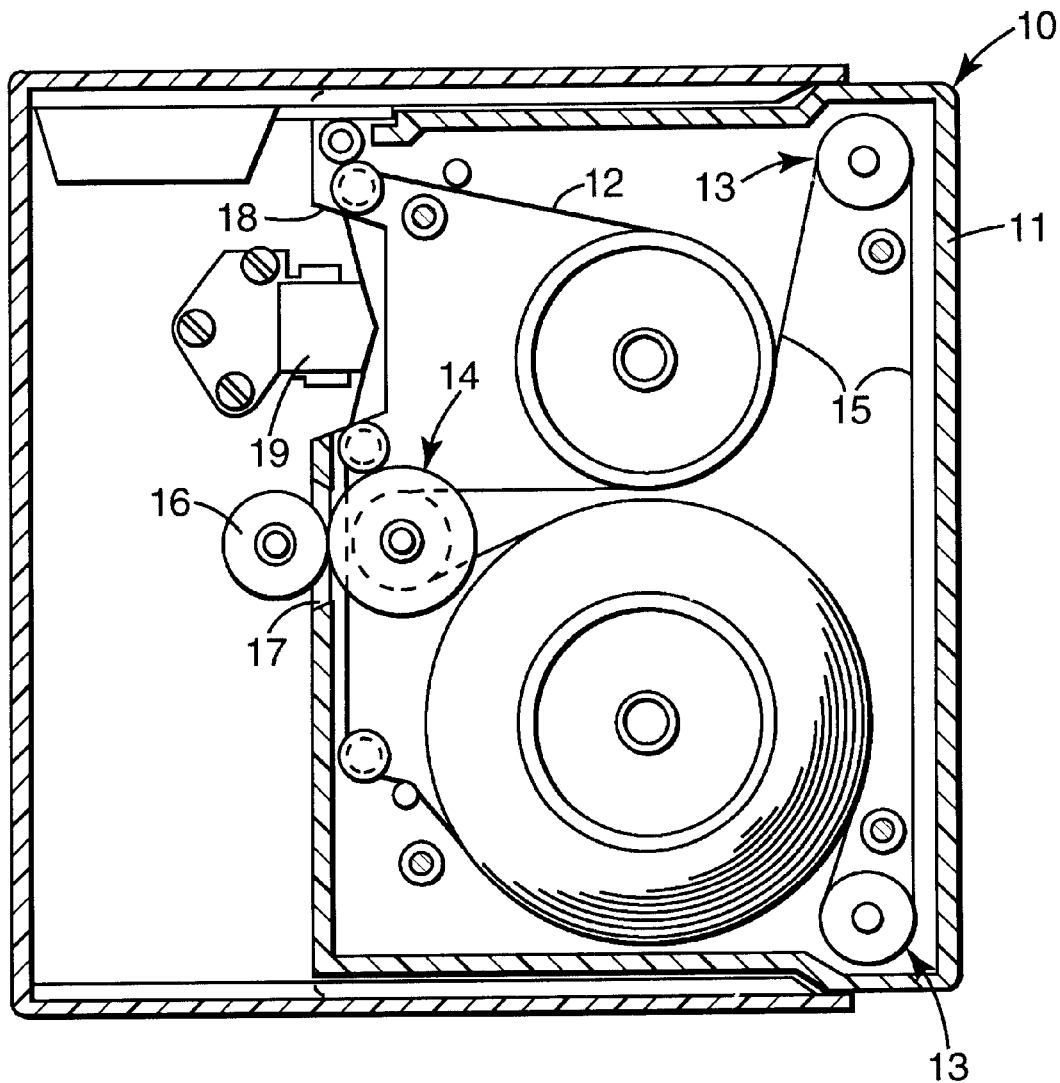
FIG. 1 is a broken-away, top view of a prior art belt-driven tape cartridge inserted into a tape drive.

The first housing section 24 and the second housing section 26 combine to form a head access window 40 at the front 32 through which storage tape (not shown) otherwise maintained within the housing 22 can be accessed by a read/write head (not shown). To this end, the tape cartridge 20 includes a door 42. The door 42 is slidably secured to the housing 22 such that the door 42 can be selectively moved to provide access to the window 40. As shown in FIG. 1, the door 42 is normally spring loaded or biased to a closed position for protecting the storage tape against contamination when not in use. In a preferred embodiment, the door 42 and related attachment components are identical to those currently available, thereby minimizing the costs of manufacture.

In a preferred embodiment, the first housing section 24 is a cover, whereas the second housing section 26 is a base. Alternatively, the design of the tape cartridge 20 can be such that the first housing section 14 forms a base, whereas the second housing section 26 is a cover. Even further, one of the two housing sections 24, 26 can be eliminated. With reference to the orientation shown in FIG. 1, the data storage tape cartridge 20 is normally inserted into a tape drive (not shown) with the cover 24 facing upward. As used throughout this specification, directional terminology, such as "upward," "downward," "vertical," "horizontal," "top," "bottom," etc. are used with reference to the orientation of the particular figure being described. It should be understood that use of the terms is for clarity only and that the data storage tape cartridge 20, and thus any of its components, may actually be orientated in any direction. As such, these terms are not meant to serve as limitations.

The first housing section 24 and the second housing section 26 are preferably made of molded plastic. In this regard, the notches 30 in the first housing section 24 are formed during the molding process. The notches 30 are preferably formed at the front 32 of the first housing section 24, extending along the first major surface 36. Alternatively, the notches 30 can be an opening or openings positioned anywhere along the housing 22, so long as access to the base plate 28 is afforded. Finally, as depicted in FIG. 2, the housing 22, and thus the tape cartridge 20, preferably increases in width from the front 32 to the back 34. In one preferred embodiment, the back 34 has a width of approximately 5.125 inches (130 mm), whereas the front 32 has a width of approximately 6 inches (152 mm). As described in greater detail below, this configuration facilitates use of the tape cartridge 20 with available registration devices via sizing of the front 32, while providing additional surface area, via the increased width at the back 54, to allow implementation of additional components while still satisfying the spacing requirements associated with industry-accepted tape drive form factors of approximately 5.8 inches (147 mm).

Figure 3:
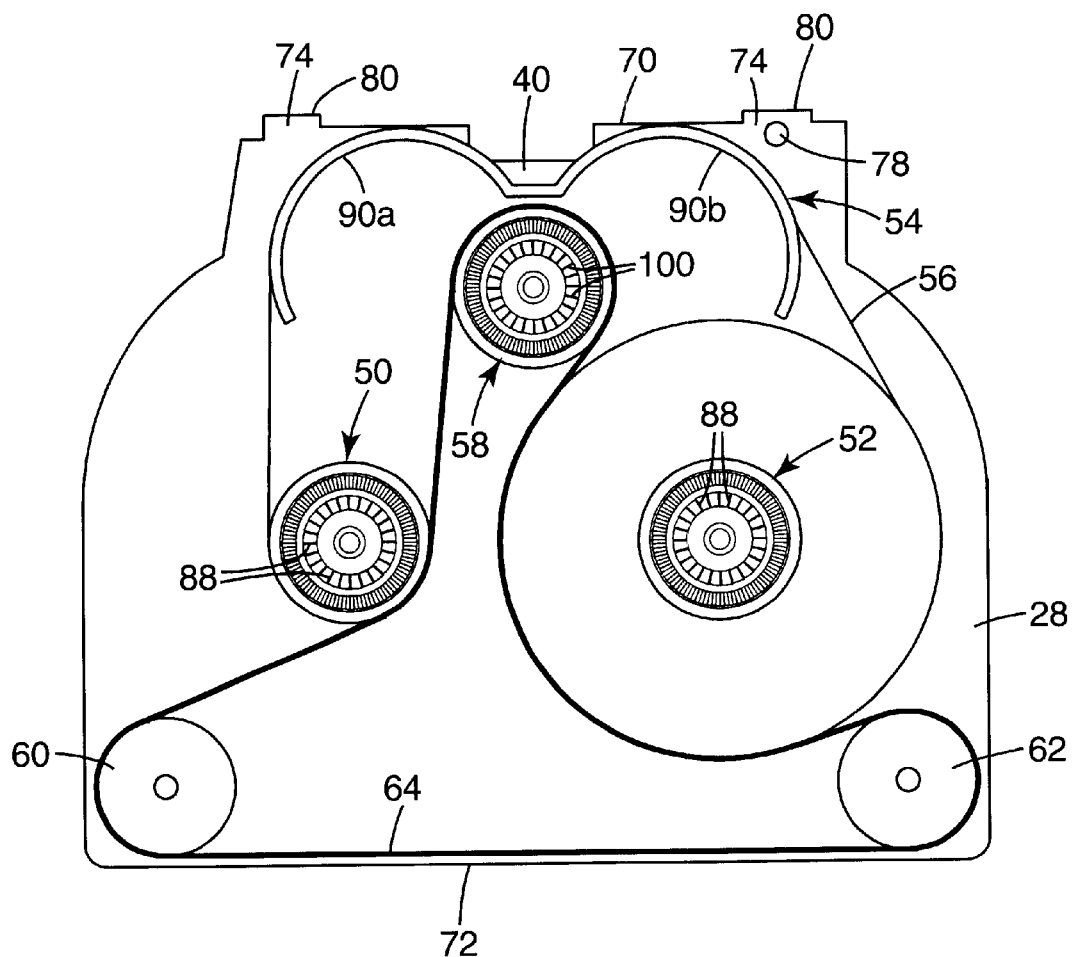
FIG. 3 is a plan view of a portion of the tape cartridge of FIG. 2.

Remaining components of the tape cartridge 20 are shown in FIG. 3. Notably, for ease of illustration, FIG. 3 depicts the tape cartridge 20 in an inverted position, and with the housing 22 removed. With this orientation in mind, the data storage tape cartridge 20 preferably includes the base plate 28, a first tape hub 50, a second tape hub 52, a tape guide 54, a storage tape 56, a drive roller 58, a first corner roller 60, a second corner roller 62, and a drive belt 64. The tape hubs 50, 52, the drive roller 58 and corner rollers 60, 62 are rotatably mounted to the base plate 28, such as by pins (not shown). The storage tape 56 is wrapped about the tape hubs 50, 52 and is fed through a predetermined tape path past or across the head access window 40 (shown generally in FIG. 3). In this regard, the tape guide 54 defines at least a portion of the tape path. The drive belt 64 is mounted around the drive roller 58, the tape packs formed on the hubs 50, 52 and the corner rollers 60, 62. With this configuration, the drive belt 64 provides a desired tension to the storage tape 56, especially at the head access window 40. Further, in one preferred embodiment, the drive roller 58 can be rotatably driven, thereby causing movement of the storage tape 56 via the drive belt 64. Alternatively, one or both of the hubs 50, 52 can be rotatably driven to cause movement of the storage tape 56.

With further reference to the layout of FIG. 3, unlike prior belt-driven tape cartridges (such as shown in FIG. 1), and the first and second tape hubs 50, 52 are symmetrically arranged relative to the head access window 40. In this regard, the drive roller 58 is preferably aligned with the head access window 40. As described in greater detail below, the symmetrically arrangement facilitates implementation of several cartridge improvements (for example, the tape guide 54), as well as providing consistent tension of the storage tape 56 at the head access window 40 as the head access window 40 is positioned at the bi-sector of the tape hubs 50, 52.

The base plate 28 conforms in size and shape with that of the housing 22 (FIG. 2). Thus, the base plate 28 preferably increases in width from a front 70 to a back 72. This configuration is highly dissimilar to prior art tape cartridge base plate designs in which a width of the base plate is substantially uniform from front to back. Regardless, the base plate 28 is sized to nest within the first housing section 24 (FIG. 2), and defines a first reference portion 74 and a second reference portion 76. A datum pin 78 is preferably positioned along or adjacent the second reference portion 76. As a point of reference, the datum pin 78 extends from an exterior surface (not shown) of the base plate 28, or into the page of FIG. 3. The reference portions 74, 76 are configured to provide a fundamental reference point for the various components maintained on the base plate 28. In particular, and as described in U.S. Pat. No. 6,069,777 (Vanderheyden et al.), the reference portions 74, 76 form a forward edge 80 of the base plate 28. The various components otherwise attached the base plate 28, such as the hubs 50, 52 and the tape guide 54, are all disposed along an interior surface 82 of the base plate 28 a predetermined distance from the forward edge 80. Consequently, because the storage tape 56 is maintained by the hubs 50, 52 and the tape guide 54, the location of the storage tape 56 relative to the reference portions 74, 76 is known. Thus, by forming the base plate 28 from a relatively rigid material, such as aluminum, stainless steel, rigid ceramic or plastic, etc., a consistent location of the storage tape 56, especially at the head access window 40, relative to the reference portions 74, 76 is achieved. Finally, the datum pin 78 is similarly made of a rigid material and is positioned adjacent the second reference portion 76 at a known location. The datum pin 78 defines a side-to-side position of the base plate 28, and thus of the various components maintained by the base plate 28.

The first and second tape hubs 50, 52 are virtually identical and are positioned to rotate relative to the base plate 28 about respective hub pins (not shown). In one preferred embodiment, the tape hubs 50, 52 are highly similar to those typically employed with belt-driven cartridges. Alternatively, and in one alternative embodiment, the hubs 50, 52 can include a toothed surface 88 formed as an axial extension of the respective hub 50, 52. With this one alternative embodiment, a portion of a tape drive (not shown) engages the toothed exterior surfaces 88 for controlled rotation of the tape hubs 50, 52. Alternatively, where a different drive technique is employed (as described below), the toothed surfaces 88 need not be included. Regardless, in a preferred embodiment, the hubs 50, 52 are made of plastic. In addition, where desired, opposing flanges (not shown) can be secured to the respective hubs 50, 52 for controlling a position of the storage tape 56 relative to the hubs 50, 52.

The tape guide 54 is secured to the interior surface 82 of the base plate 28, and is preferably an elongated engagement guide including opposing arcuate sections 90*a*, 90*b*. The tape guide 54 preferably has a length greater than a length of the head access window 40, as depicted in FIG. 3. The opposing arcuate sections 90*a*, 90*b* are located at opposite sides of the head access window 40 and are designed to provide "flying" guidance of the storage tape 56 as is known in the art. Basically, at elevated tape speeds, the shape of the arcuate sections 90*a*, 90*b*, in conjunction with the material selected for the tape guide 54, creates a self-acting air bearing (or hydrodynamic lift) between the storage tape 56 and the tape guide 54 such that the storage tape 56 effectively "flies" along the accurate sections 90*a*, 90*b* of the tape guide 54. The boundary layer of air at the tape surface is carried into, or entrained into, the interface between the storage tape 56 and the tape guide 54. At slower tape speeds, the storage tape 56 contacts and frictionally engages the tape guide 54. Implementation of a flying-type tape guide 54 greatly reduces variations in tape tension during use, and is especially useful in minimizing the "bow-tie" effect. Bow-tie refers to variation in tape tension and drive force as the storage tape 56 is wound from the beginning of the tape (BOT) to the end of the tape (EOT), and back again. Importantly, the design constrains associated with prior art belt-driven tape cartridges (for example, shown in FIG. 1) prevent the incorporation of the elongated, flying-type tape guide 54 due to space limitations and the required capstan/drive roller interface. Alignment of the drive roller 58 with the head access window 40 in conjunction with the fact that radial access to the drive roller 58 is no longer required provides sufficient spacing for inclusion of the elongated flying-type tape guide 54. As such, the tape guide 54 can be positioned between the head access window 40 and the drive roller 58. Alternatively, however, the elongated flying-type guide 54 can be conventionally replaced by one or more pins, rollers, etc.

The storage tape 56 is preferably a magnetic tape of a type commonly known in the art. For example, the storage tape 56 may consist of a balanced polyethylene naphthalate (PEN) based material coated on one side with a layer of magnetic material dispersed within a suitable binder system, and on the other side with a conductive material dispersed within a suitable binder system. Acceptable magnetic tape is available, for example, from Imation Corp., of Oakdale, Minn. In one preferred embodiment, the storage tape 56 has a backing or base film thickness of 18-gauge (180 microinches or 4.6 micrometers) for a total thickness of approximately 300 microinches (7.6 micrometers) and a width of approximately 0.5 inch (12.7 mm). Notably, the preferred 0.5 inch tape width is more than double the tape width utilized with currently available belt-driven tape cartridges. Alternatively, other dimensions are equally acceptable.

The drive roller 58 is rotatably mounted to the interior surface 82 of the base plate 28 by a pin (not shown). The drive roller 58 is preferably similar in size and construction to the hubs 50, 52, thereby minimizing manufacture costs. Alternatively, other configurations are equally acceptable. In one preferred embodiment, the drive roller 58 forms a drive surface 100, preferably in the form of teeth. The drive surface or teeth 100 are formed at a top of the drive roller 58, extending in a generally radial fashion from a central axis. With this one preferred embodiment, and as described in greater detail below, the teeth 100 are engageable by a drive chuck or motor (not shown) associated with a tape drive (not shown). Once engaged, the drive roller 58 is rotatably driven, resulting in transport of the storage tape 56 via the drive belt 64. Alternatively, where the tape cartridge 20 (FIG. 2) is configured such that one or both of the hubs 50, 52 are spool driven, the teeth 100 formed on the drive roller 58 can be eliminated.

The corner rollers 60, 62 are similarly rotatably mounted to the interior surface 82 of the base plate 28, such as by pins (not shown). In one preferred embodiment, the base plate 28 (and thus the tape cartridge 20 of FIG. 2) is sized to provide sufficient surface area for implementation of magnetic hysteresis brake-type corner rollers 60, 62. Magnetic hysteresis brake rollers are well known in the art and are configured such that tape drag is generated by a magnetic hysteresis effect as opposed to a journal bearing drag. As a result, the preferred corner rollers 60, 62 are virtually speed and temperature independent. In general terms, a magnetic hysteresis brake corner roller includes a cylindrical permanent magnetic within the roller, along with a remanently magnetizable cylindrical sleeve surrounding the permanent magnetic. Notably, while it may be possible to implement magnetic hysteresis brake-type corner rollers with existing belt-driven cartridges (FIG. 1), the size constraints associated with prior art belt-driven cartridge form factors restricts an available radius for the corner rollers (on the order of 0.21 inch, 5.33 mm radius). As a result, a magnetic hysteresis brake corner roller in existing belt-driven cartridges could generate only a limited amount of tape tension (on the order of 1 ounce). Unfortunately, this limited tension value is insufficient for acceptable cartridge performance so that current belt-driven tape cartridges cannot make use of this beneficial component. The tape cartridge 20 of the present invention overcomes this concern by affording additional surface area along the base plate 28 such that the corner rollers 60, 62 have sufficient radii for example, in the range of 0.25–0.6 inch (6.35–15.2 mm), preferably 0.45 inch (11.4 mm), although other dimensions can be employed. This increased radius allows the corner rollers 60, 62 to generate increased tape tension, on the order of 2 or more ounces. Thus, corner rollers 60, 62 incorporating magnetic hysteresis brakes are viable with the tape cartridge 20 of the present invention. It will be recognized, however, that conventional designs may instead be employed for the corner rollers 60, 62.

Finally, the drive belt 64 extends along the depicted drive belt path such that the drive belt 64 frictionally engages a portion of the storage tape 56 to cause transport of the storage tape 56 between the hubs 50, 52. The length of the unstretched drive belt 64 is less than the length of the drive belt path so that the drive belt 64 is stretched when inserted into the cartridge 20. The drive belt 64 of the present invention may be made of any suitable elastomeric material, and is preferably configured as an endless belt. Examples of suitable elastomeric materials include polyurethanes, polyurethane polyethers, polyurethane polyesters, and combinations thereof.

Due to the symmetrical layout of the hubs 50, 52 relative to the head access window 40, and in particular, alignment of the drive roller 58 with the head access window 40, the tape cartridge 20 of the present invention cannot be driven by a capstan or drive puck as otherwise used with prior art belt-driven cartridges (for example, as shown in FIG. 1). More particularly, during use, a head (not shown) will engage the storage tape 56 at the head access window 40. As a result, the head would impede or prevent a capstan (not shown) from extending radially through the head access window 40 and into contact with the drive roller 58. Implementation of the preferred elongated flying tape guide 54 further impedes this interaction. Instead, the tape cartridge 20 of the present invention is specifically designed to be spline-driven. This splined driving technique can be effectuated by driving either the drive roller 58 or one or both of the hubs 50, 52, as described below.

Figure 4A:
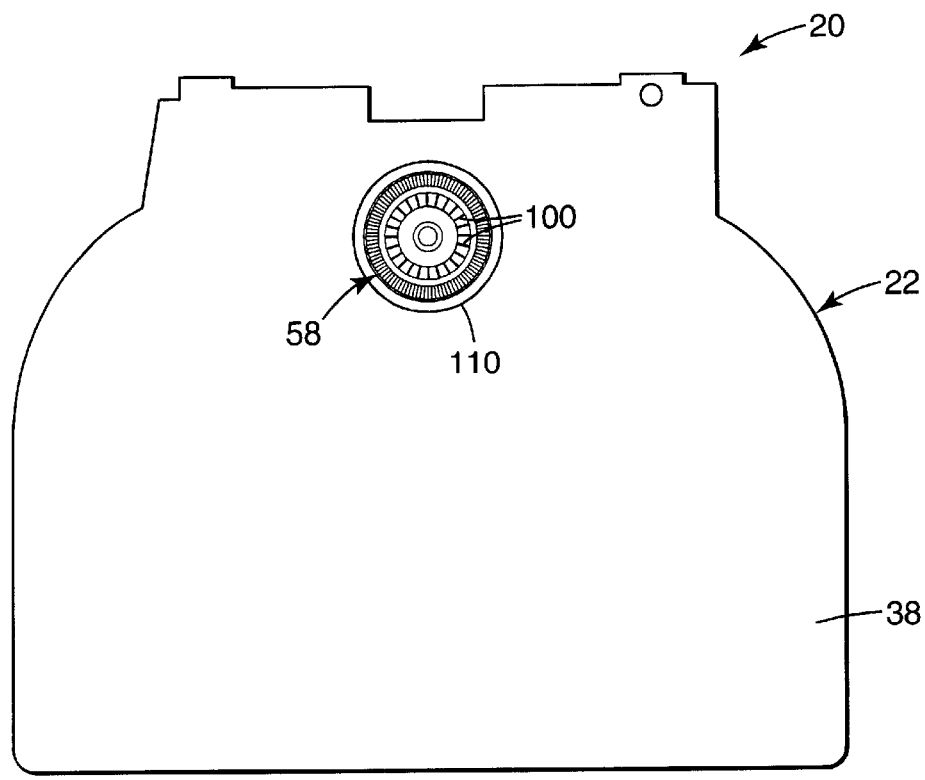
FIG. 4A is a bottom view of the tape cartridge of FIG. 2.

In one preferred embodiment, the drive roller 58 is rotatably driven so as to dictate movement of the storage tape 56. In this regard, and as shown in FIG. 4A, the housing 22, and in particular the second major surface 38, is formed to include a passage or opening 110 for providing axial access to the drive roller 58. As illustrated in FIG. 4A, the opening 110 is axially aligned with the drive roller 58. As a result, engagement of the drive roller 58 is accomplished by axially directing a rotatably driven, splined drive chuck or motor (not shown) toward the drive roller 58 (into the page of FIG. 4A). This is in direct contrast to prior art belt-driven tape cartridges (FIG. 1) in which a capstan is maneuvered radially relative to the drive roller for subsequent engagement. By forming the cartridge 20 so as to provide for motorized splined drive chuck engagement with the drive roller 58, the speed and power losses associated with capstan driving techniques are eliminated. Further, only a single motor is required, thereby reducing overall costs of the tape drive as compared to available dual-reel, spool-driven tape cartridges. Finally, in a preferred embodiment, the drive roller 58 and in particular the toothed surface 100, is formed identical to existing spool-driven hubs so that existing chuck/motors can be used, again reducing overall costs.

Figure 4B:
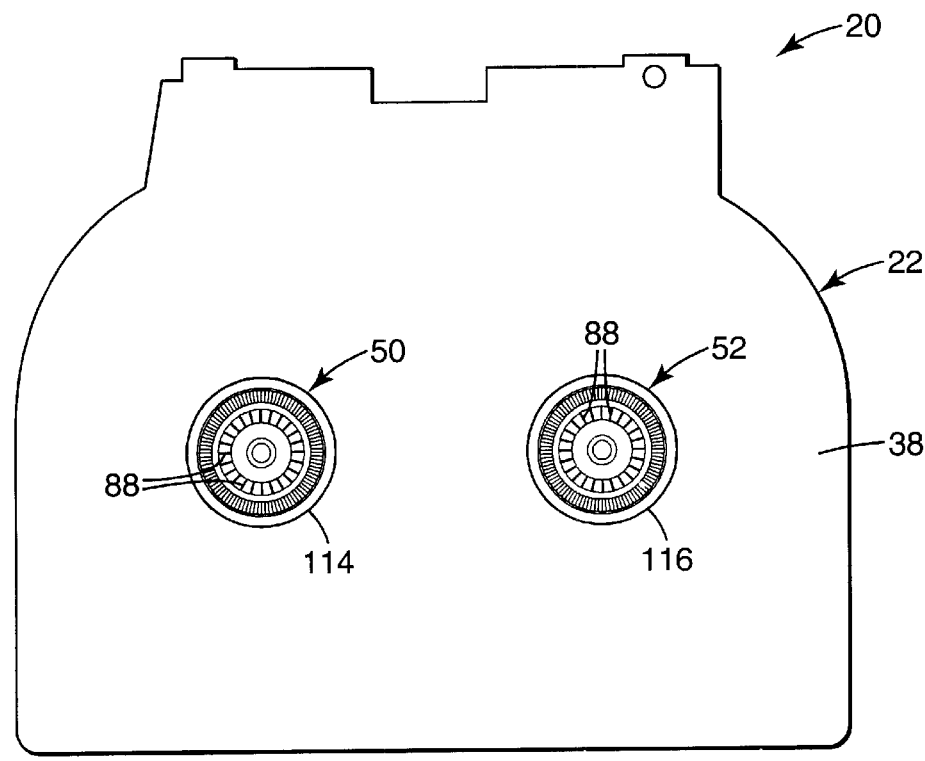
FIG. 4B is a bottom view of an alternative tape cartridge.

Alternatively, the tape cartridge 20 can be configured to provide for direct driving of the hubs 50, 52 (FIG. 3). In this regard, and as shown in FIG. 4B, the housing 22, and in particular the second major surface 38, forms a first opening 114 and a second opening 116. The first opening 114 is axially aligned with the first tape hub 50 (shown partially in FIG. 4B), whereas the second opening 116 is axially aligned with the second tape hub 52 (shown partially in FIG. 4B). The openings 114, 116 facilitate axial engagement of the tape hubs 50, 52 by two drive motors (not shown), respectively, associated with a tape drive (not shown). In particular, similar to available spool-driven tape cartridges, during use, two independent drive chucks engage the toothed surfaces 88 of the tape hubs 50, 52 via the openings 114, 116, and selectively rotate the hubs 50, 52. With this alternative embodiment, then, the drive roller 58 (FIG. 3) is not directly engaged or driven by the tape drive. However, as previously described, the drive roller 58, in conjunction with the corner rollers 60, 62 (FIG. 3) and the drive belt 64 (FIG. 3), maintains a desired tension in the storage tape 56 (FIG. 3). Thus, unlike prior art, spool-driven tape cartridges, the tape cartridge 20 of the present invention does not require an intricate and expensive servo system to provide adequate storage tape tension.

Figure 5:
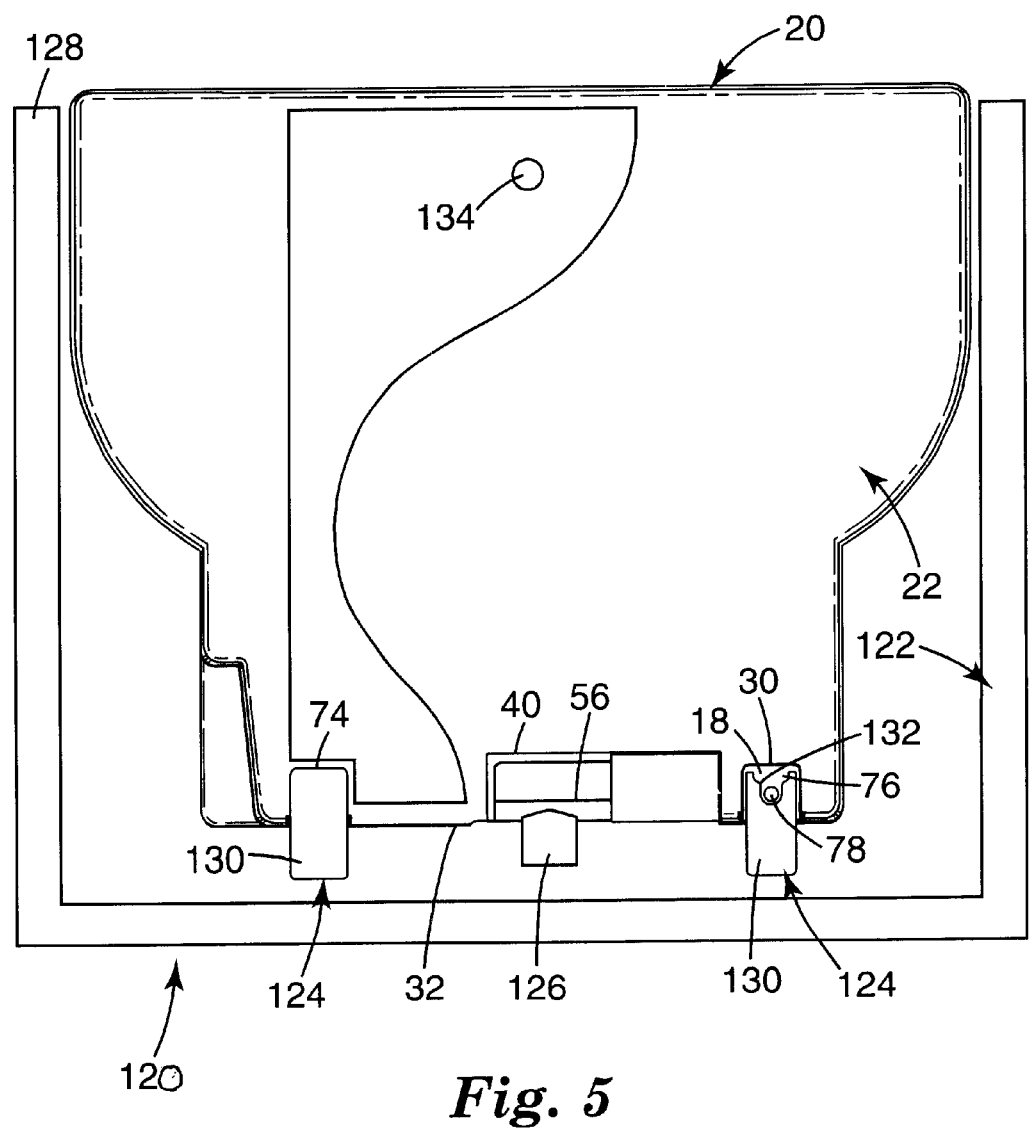
FIG. 5 is a top view of a data storage tape cartridge and tape drive system in accordance with the present invention.

During use, the data storage tape cartridge 20 of the present invention utilizes the base plate 28 as a fundamental reference point. To this end, FIG. 5 depicts insertion of the data storage tape cartridge 20 into a tape drive 120. The tape drive 120 includes a frame 122, a registration device 124 and a read/write head 126. For ease of illustration, the frame 122, the registration device 124 and the read/write head 126 are shown in block form. The frame 122 defines a cartridge insertion opening 128 into which the data storage tape cartridge 20 is inserted. As shown by the orientation of FIG. 5, the tape cartridge 20 is positioned such that front 32 is adjacent the read/write head 126. The registration device 124 includes datum arms 130 for engaging the first and second reference portions 74, 76 of the base plate 18 (FIG. 3). Once again, the first and second reference portions 74, 76 are accessible exteriorly of the housing 22 via the notches 30. Additionally, the datum arm 130 adjacent the second reference portion 76 includes a slot 132 sized to receive the datum pin 78.

In general terms, upon engaging the first and second reference portions 74, 76, the registration device 124 controls the vertical location (or skew) of the tape cartridge 20, and thus of the storage tape 56 (FIG. 3), relative to the read/write head 126 via the reference portions 74, 76. Similarly, the registration device 124 controls the forward location of the tape cartridge 20, and thus of the storage tape 56, relative to the read/write head 126 via the first and second reference portion 74, 76. The forward location of the storage tape 56 defines a penetration of the read/write head 126 into the housing 22 at the head access window 40. The registration device 124 also controls the tilt of the tape cartridge 20 by reference to an external datum point 134 of the first housing section 24 and the first and second reference portions 74, 76. Finally, the registration device 124 controls side-to-side positioning of the tape cartridge 20, and thus a wrap angle of the storage tape 56 relative to the read/write head 126 via the datum pin 78.

As described above, then, the tape cartridge 20 is configured to provide three datum or registration location points, including two provided by the reference portion 74, 76. This is in contrast to prior art belt-driven cartridges (for example, as shown in FIG. 1) that rely upon two point registration.

Figure 6:
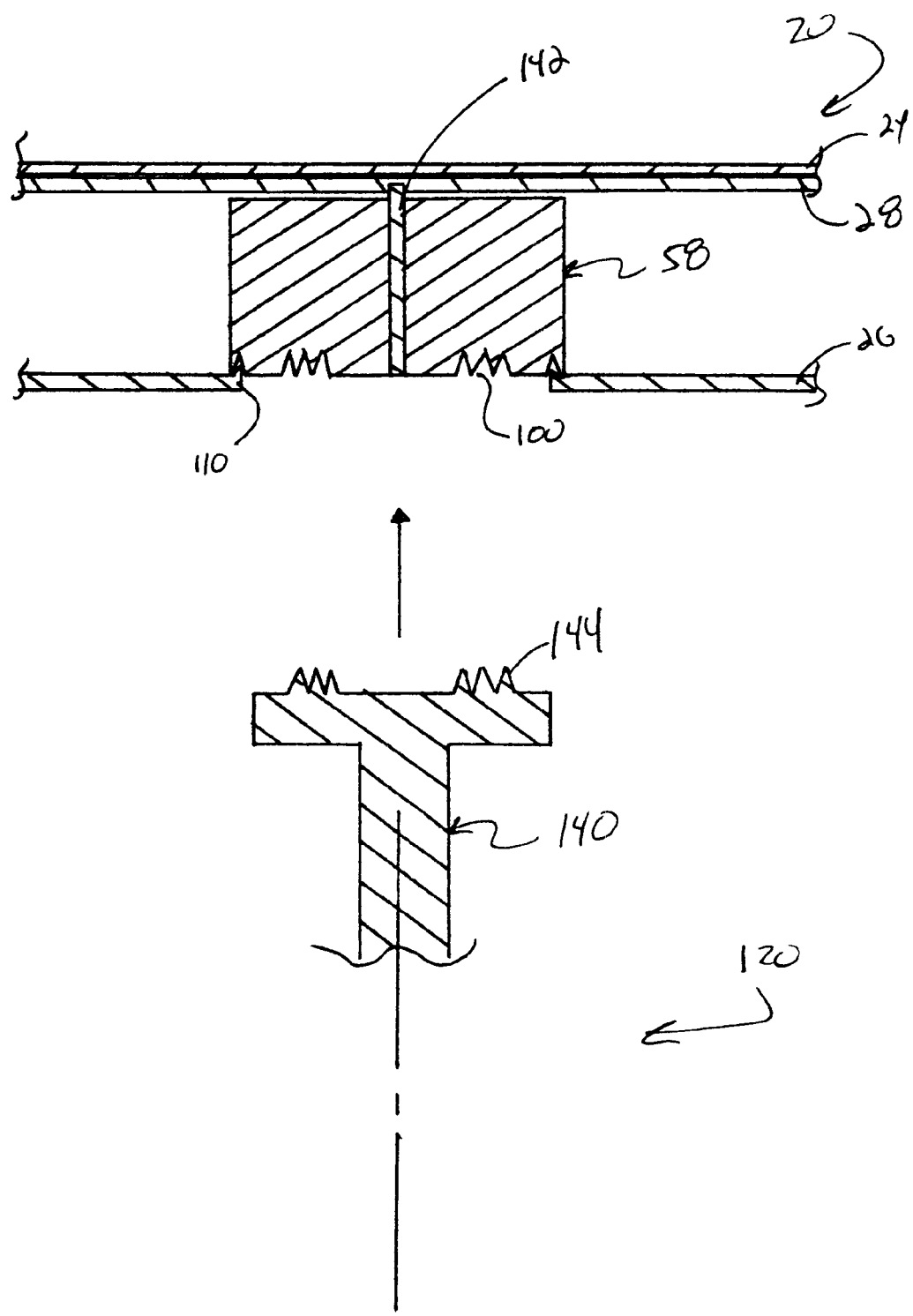
FIG. 6 is an enlarged, cross-sectional view of the system of FIG. 5, including a drive roller and splined drive chuck.

Axial engagement of the drive roller 58 by a splined drive chuck 140 in accordance with one preferred embodiment of the present invention is depicted in FIG. 6. As a point of reference, FIG. 6 presents an enlarged, cross-sectional view of the tape drive 120, and in particular the drive chuck 140, and a portion of the tape cartridge 20, including the housing sections 24, 26, the base plate 28 and the drive roller 58. Notably, in one preferred embodiment, the drive roller 58 is rotatably associated with the base plate 28 by a pin 142.

As shown in FIG. 6, the drive chuck 140 forms teeth 144 for engaging the drive surface or teeth 100 of the drive roller 58. The drive chuck 140 is rotatably driveable by a motor (not shown) about a rotational axis (represented by a dashed line in FIG. 6), and is configured to be moveable along this rotational axis for axially engaging the drive roller 58, as otherwise shown by an arrow in FIG. 6. During use, then, following insertion of the tape cartridge 20 into the tape drive 120 (the position shown in FIG. 5), the drive chuck 140 is maneuvered axially along the rotational axis (upwardly in FIG. 6) to engage the drive roller 58. Once engaged, the drive chuck 140 is rotated to rotatably drive the drive roller 58. Notably, in one preferred embodiment and with additional reference to FIG. 5, the drive chuck 140 is aligned with the read/write head 126 to facilitate drive chuck 140/drive roller 58 engagement as well as read/write head 126/storage tape 56 interaction. This is in contrast to prior art belt-driven tape cartridge tape drives that is offset from the read/write head.

Returning to FIG. 3, because the tape cartridge 20 of the present invention incorporates the drive belt 64 to provide sufficient storage tape tension, the storage tape 56 can be thinner than that used with currently available spool-driven cartridges. For example, in one preferred embodiment, the storage tape 56 has a backing thickness of 18-gauge and a total thickness of approximately 300 microinches, as compared to a backing thickness of 26-gauge and a total thickness of approximately 400 microinches found with storage tape employed in available spool-driven tape cartridges. Due to this reduced thickness, the storage tape 56 associated with the present invention can have an increased length as compared to prior art spool-driven cartridges even though an identical hub (such as the hubs 50, 52) is used. For example, use of a thinner storage tape would provide approximately 15% more surface area of tape as compared to currently available spool-driven tape cartridges having identical hub sizes. In addition, even though the tape cartridge 20 has more magnetic surface area than that found with currently available spool-driven cartridges, each of the tape packs formed by the first and second tape hubs 50, 52 would actually have 15% less rotation inertia because the outer diameter of each tape pack is reduced as compared to that found with currently available spool-driven tape cartridges. This reduction in rotational inertia provides for improved performance during starting and stopping modes of operation.

The data storage tape cartridge of the present invention provides marked improvements over previous designs. In particular, the tape cartridge is a hybrid design, uniquely implementing features and benefits associated with available belt-driven and spool-driven tape cartridges. The resulting cartridge provides highly efficient storage tape tension found with belt-driven cartridges, yet eliminates the power and speed losses. In addition, the tape cartridge of the present invention preferably includes three datum points for more accurate registration as compared to available belt-driven cartridges. Finally, the tape cartridge of the present invention, along with the associated tape drive, incorporates many parts already available, and is less expensive than spool-driven cartridges.

Although the present invention has been described with reference to preferred embodiments, workers skilled in the art will recognize that changes can be made in form and detail without departing from the spirit and scope of the present invention.

What is claimed is:

1. A data storage tape cartridge comprising:
   a housing defining a head access window;
   first and second tape hubs rotatably mounted within the housing;
   a storage tape wound about the first and second hubs to form first and second tape packs thereabout;
   a drive roller rotatably mounted within the housing, wherein a lateral position of the drive roller relative to the housing is fixed;
   first and second corner rollers rotatably mounted within the housing; and
   a drive belt stretched about the drive roller, the first and second tape packs, and the first and second corner rollers;
   wherein the first and second hubs are symmetrically arranged relative to the head access window.

2. The data storage tape cartridge of claim 1, wherein the drive roller is aligned with the head access window.

3. The data storage tape cartridge of claim 1, wherein the housing defines opposing major sources and further wherein an opening is formed in one of the opposing major surfaces for axially accessing a component selected from the group consisting of the first and second tape hubs and the drive roller.

4. The data storage tape cartridge of claim 3, wherein the opening is axially aligned with the drive roller.

5. The data storage tape cartridge of claim 4, wherein the drive roller is configured to be axially engaged by a drive chuck to drive movement of the drive roller.

6. The data storage tape cartridge of claim 5, wherein the drive roller includes teeth for engagement by a drive chuck.

7. The data storage tape cartridge of claim 3, wherein the opening is axially aligned with the first tape hub to allow axial engagement of the first tape hub by a drive chuck.

8. The data storage tape cartridge of claim 7, wherein a second opening is formed in the major surface adjacent the first opening, the second opening being axially aligned with the second tape hub to allow axial engagement of the second tape hub by a drive chuck.

9. The data storage tape cartridge of claim 1, wherein the data storage tape cartridge is configured to provide three datum locations for registration by a registration device.

10. The data storage tape cartridge of claim 9, further comprising:
    a base plate disposed within the housing, the base plate having first and second reference portions and maintaining the first and second hubs, the drive roller and the first and second corner roller;
    wherein the first and second reference portions are accessible from an exterior of the housing and define two of the datum locations.

11. The data storage tape cartridge of claim 10, wherein the first reference portion includes a pin sized to be received by a datum arm.

12. The data storage tape cartridge of claim 1, wherein the corner rollers each include a magnetic hysteresis brake.

13. The data storage tape cartridge of claim 1, wherein the storage tape has a height of approximately 0.5 inch and a backing thickness of approximately 18-gauge.

14. The data storage tape cartridge of claim 1, further comprising:
    an elongated tape guide extending across and having a length greater than a length of the head access window.

15. The data storage tape cartridge of claim 14, wherein the elongated tape guide is positioned between the window and the drive roller.

16. A data storage tape cartridge comprising:
    a housing defining a head access window;
    first and second tape hubs rotatably mounted within the housing;
    a storage tape wound about the first and second tape hubs to form first and second tape packs thereabout;
    a drive roller rotatably mounted within the housing, wherein a lateral position of the drive roller relative to the housing is fixed;
    first and second corner rollers rotatably mounted within the housing; and
    a drive belt stretched about the drive roller, the first and second tape packs, and the first and second corner rollers;
    wherein the drive roller is aligned with the head access window such that upon engagement with a tape drive including a head, interaction between the head and the storage tape at the head access window impedes radial access to the drive roller.

17. The data storage tape cartridge of claim 16, wherein the first and second hubs are symmetrically arranged relative to the head access window.

18. The data storage tape cartridge of claim 16, wherein the housing defines opposing major surfaces and further wherein an opening is formed in one of the opposing major surfaces for axially accessing a component selected from the group consisting of the first and second tape hubs and the drive roller.

19. The data storage tape cartridge of claim 18, wherein the opening is axially aligned with the drive roller.

20. The data storage tape cartridge of claim 18, wherein the opening is axially aligned with the first tape hub to allow axial engagement of the first tape hub by a drive chuck.

21. The data storage tape cartridge of claim 16, wherein the data storage tape cartridge is configured to provide three datum locations for registration by a registration device.

22. The data storage tape cartridge of claim 21, further comprising:
   a base plate disposed within the housing, the base plate having first and second reference portions and maintaining the first and second hubs, the drive roller and the first and second corner rollers;
   wherein the first and second reference portions are accessible from an exterior of the housing and define two of the datum locations.

23. The data storage tape cartridge of claim 16, wherein the corner rollers each include a magnetic hysteresis brake.

24. The data storage tape cartridge of claim 16, further comprising:
   an elongated tape guide extending across and having a length greater than a length of the window.

25. The data storage tape cartridge of claim 24, wherein the elongated tape guide is positioned between the window and the drive roller.

26. A combination data storage tape cartridge and tape drive comprising:
   a data storage tape cartridge including:
      a housing defining a head access window,
      first and second tape hubs rotatably mounted within the housing,
      a storage tape wound about the first and second hubs to form first and second tape packs thereabout,
      a drive roller rotatably mounted within the housing, wherein a lateral position of the drive roller relative to the housing is fixed,
      first and second corner rollers rotatably maintained within the housing,
      a drive belt stretched about the drive roller, the first and second tape packs and the first and second corner rollers; and
   a tape drive including:
      a rotatably driveable splined drive chuck for engaging one of the drive roller and the first and second tape hubs;
   wherein the tape drive does not include a capstan for engaging the drive roller.

27. The combination of claim 26, wherein the drive roller is aligned with the head access window.

28. The combination of claim 27, wherein the housing defines opposing major surfaces and includes an opening in one of the opposing surfaces for allowing axial access by the drive chuck to one of the drive roller and first and second hubs.

29. The combination of claim 28, wherein the opening is axially aligned with the drive roller.

30. The combination of claim 28, wherein the opening is axially aligned with the first tape hub.

31. A tape drive for driving a data storage tape cartridge including a drive belt stretched about a laterally fixed drive roller and two tape packs, the tape drive comprising:
   a rotatably driven, splined drive chuck configured to axially engage and rotatably drive a laterally fixed drive roller.

32. The tape drive of claim 31, wherein the drive chuck includes teeth for engaging the drive roller.

33. The tape drive of claim 31, wherein the drive chuck defines a rotational axis, and further wherein the drive chuck is configured to be moveable along the rotational axis for axially engaging the drive roller.

34. The tape drive of claim 31, wherein the tape drive does not include a capstan for engaging the drive roller.

35. The tape drive of claim 31, further comprising:
   a read/write head for engaging storage tape maintained by the data storage tape cartridge;
   wherein the drive chuck is aligned with the read/write head.

36. A data storage tape cartridge comprising:
   a housing defining a head access window;
   first and second tape hubs rotatably mounted within the housing;
   an elongated tape guide located adjacent the head access window and having a length greater than a length of the head access window;
   a storage tape wound about the first and second tape hubs, to form first and second tape packs thereabout, and guided across the head access window by the elongated tape guide;
   a drive roller rotatably mounted within the housing, wherein a lateral position of the drive roller relative to the housing is fixed;
   first and second corner rollers rotatably mounted within the housing; and
   a drive belt stretched about the drive roller, the first and second tape packs, and the first and second corner rollers.

37. The data storage tape cartridge of claim 36, wherein the elongated tape guide is positioned between the window and the drive roller.

38. The data storage tape cartridge of claim 36, wherein the elongated tape guide includes first and second arcuate sections positioned at opposite sides of the head access window, respectively.

39. The data storage tape cartridge of claim 36, wherein the first and second arcuate sections are configured to provide flying guidance of the storage tape at elevated tape speeds.

40. The data storage tape cartridge of claim 36, wherein the head access window and the drive roller are aligned.

41. The data storage tape cartridge of claim 36, wherein the first and second tape hubs are symmetrically arranged relative to the head access window.

* * * * *